United States Patent
Bergman et al.

(10) Patent No.: US 11,806,563 B1
(45) Date of Patent: Nov. 7, 2023

(54) FIRE RETARDANT FOR WILDFIRE CONTROL AND METHODS OF USE

(71) Applicant: Siege Engineering, Houston, TX (US)

(72) Inventors: Lee Bergman, Houston, TX (US); Trent Weiss, Houston, TX (US)

(73) Assignee: Siege Engineering, Houston, TX (US)

( * ) Notice: Subject to any disclaimer, the term of this patent is extended or adjusted under 35 U.S.C. 154(b) by 0 days.

(21) Appl. No.: 18/065,677

(22) Filed: Dec. 14, 2022

Related U.S. Application Data

(60) Provisional application No. 63/382,244, filed on Nov. 3, 2022.

(51) Int. Cl.
| | | |
|---|---|---|
| A62D 1/00 | (2006.01) | |
| B01J 13/04 | (2006.01) | |
| B01J 13/22 | (2006.01) | |
| A62C 3/02 | (2006.01) | |

(52) U.S. Cl.
CPC .......... *A62D 1/0021* (2013.01); *A62C 3/0228* (2013.01); *B01J 13/043* (2013.01); *B01J 13/22* (2013.01)

(58) Field of Classification Search
None
See application file for complete search history.

(56) References Cited

U.S. PATENT DOCUMENTS 5,778,984 A * 7/1998 Suwa .................. A62D 1/00
169/36

FOREIGN PATENT DOCUMENTS

| CN | 111111081 A | * | 5/2020 | |
|---|---|---|---|---|
| JP | 2020081809 A | * | 6/2020 | |
| WO | WO-2013006051 A1 | * | 1/2013 | ............. B01D 53/28 |

* cited by examiner

*Primary Examiner* — Tanisha Diggs
(74) *Attorney, Agent, or Firm* — Haynes and Boone, LLP

(57) ABSTRACT

A fire-retardant particle comprises a core formed of an aqueous solution and one or more inorganic compounds, which comprise ammonium phosphate. The particle further comprises a waterproof shell encasing the core. In an embodiment, a method of fighting a fire comprises encasing a hydrated fire-retardant compound in a waterproof shell of a fire-retardant particle. The fire-retardant particle is deployed in an area of fire. Moisture within the waterproof shell is heated by the fire. The waterproof shell ruptures as a result of the heated moisture so as to deploy the fire-retardant compound.

16 Claims, 2 Drawing Sheets

FIRE RETARDANT FOR WILDFIRE CONTROL AND METHODS OF USE

PRIORITY CLAIM

This application claims the benefit of priority to U.S. Provisional Application No. 63/382,244, filed Nov. 3, 2022, the benefit of which is claimed and the disclosure of which is incorporated by reference in its entirety.

FIELD

The disclosure relates to aerial wildfire fighting, and in particular, a single dry fire retardant that can be dispersed on an active fire or deployed prior to a fire in locations where a wildfire is likely or prone to occur.

BACKGROUND

Existing wildfire retarders are aqueous solutions where the active chemical is typically phosphates or borates dissolved in an aqueous solution. These active chemicals, when within a fire, aid partial combustion of the cellulose fuel to char the surface of the burning material, resulting in a hard carbonized coating. This hard carbonized coating on the potentially combustible material becomes difficult to oxidize further, thus decreasing the energy released upon burning, rendering a fire less intense and easier to extinguish.

Current aerial wildfire fighting products are sprayed from airplanes or helicopters as a dilute solution of this active chemical, where less than 15%, and often as little as 5%-10% by weight, of the solution is active chemical while the majority of the remainder of the solution is water. In addition to delivering very little active chemical per gallon of solution sprayed from an aerial craft, being comprised primarily of water, the solution tends to drift significantly upon release, even with viscosity "thickening agents," making it more difficult to deliver the active chemical to a specific ground location for fighting a fire.

In any event, the firefighting solutions are different based on how the solution is being utilized. The first product is for application on the edges of an active fire. The second product is a "proactive" one, where it is applied in advance of where a fire may occur. The key difference between the active and proactive application products is that the active product is expected to be "wet" then engulfed in the fire, while the proactive product would normally be dry when exposed to a fire. Moreover, proactive applications are typically readily susceptible to rainfall that can quickly wash away the products once deployed.

SUMMARY

Described herein is a dry, aerial wildfire fighting product in the form of prills, particles, granules, or beads of generally uniform diameter within a controlled size range. For ease of discussion, the term prill as used herein shall include prills, particles, granules, beads, or similar spherical structures of a generally uniform size range. Being a dry product, while the product is readily sprayable from an aerial craft, the prills or particles will have much less of a tendency to drift upon spraying as with a liquid product, but will instead fall more directly to a determined ground location. Moreover, the same product may be deployed on an active fire or proactively on potentially combustible locations. Finally, the product is much less susceptible to impact of rainfall, as described more specifically below.

The following presents a simplified summary of various examples described herein and is not intended to identify key or critical elements or to delineate the scope of the claims.

Consistent with some embodiments, a fire-retardant particle is provided. The fire-retardant particle includes a core formed of an aqueous solution and one or more inorganic compounds. The one or more inorganic compounds include ammonium phosphate. The fire-retardant particle further includes a waterproof shell encasing the core.

Consistent with some embodiments, a prill, granule, or bead of a controlled size range is provided. The prill, granule, or bead includes a core formed of one or more inorganic compounds. The one or more inorganic compounds include ammonium phosphate and an aqueous solution. The prill, granule, or bead further includes a waterproof shell encasing the core.

Consistent with some embodiments, a fire-retardant particle is provided. The fire-retardant particle includes a core formed of at least 85% by weight of ammonium phosphate and no more than 10% by weight of an aqueous solution. The fire-retardant particle further includes a waterproof shell encasing the core.

Consistent with some embodiments, a method of fighting a fire is provided. The method includes encasing a hydrated fire-retardant compound in a waterproof shell of a fire-retardant particle. The method further includes deploying the fire-retardant particle in an area of fire. The method further includes heating moisture within the waterproof shell utilizing the fire. The method further includes rupturing the waterproof shell utilizing the heated moisture so as to deploy the fire-retardant compound.

It is to be understood that both the foregoing general description and the following detailed description are illustrative and explanatory in nature and are intended to provide an understanding of the various examples described herein without limiting the scope of the various examples described herein. In that regard, additional aspects, features, and advantages of the various examples described herein will be apparent to one skilled in the art from the following detailed description.

BRIEF DESCRIPTIONS OF THE DRAWINGS

Figure 1:
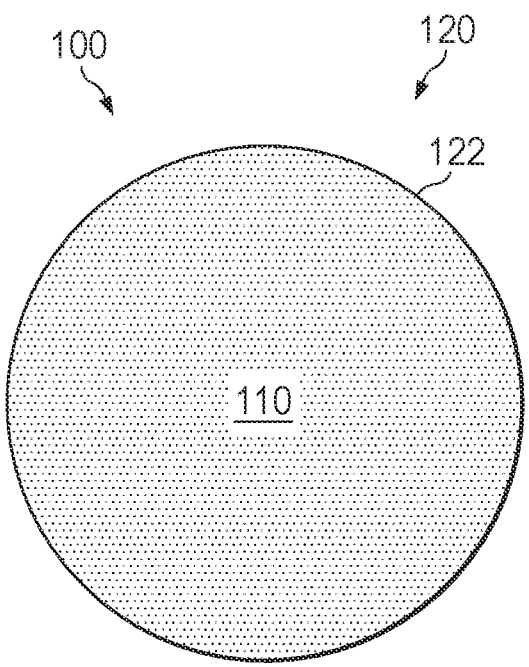
FIG. 1 illustrates a fire-retardant particle with a waterproof outer shell including a coating according to some embodiments.

Various embodiments described herein and their advantages are described in the detailed description that follows. It should be appreciated that like reference numerals are used to identify like elements illustrated in the figure for purposes of illustrating but not limiting the various embodiments described herein.

DETAILED DESCRIPTION

In one or more embodiments, each fire-retardant particle 100, such as a prill, is formed of a waterproof outer shell 120 with a core 110 of a hydrated, fire-retardant active chemical formed of an active chemical component and a moisture component. In one or more embodiments, the active chemical component of core 110 is ammonium phosphate ($NH_4$)

Figure 2:
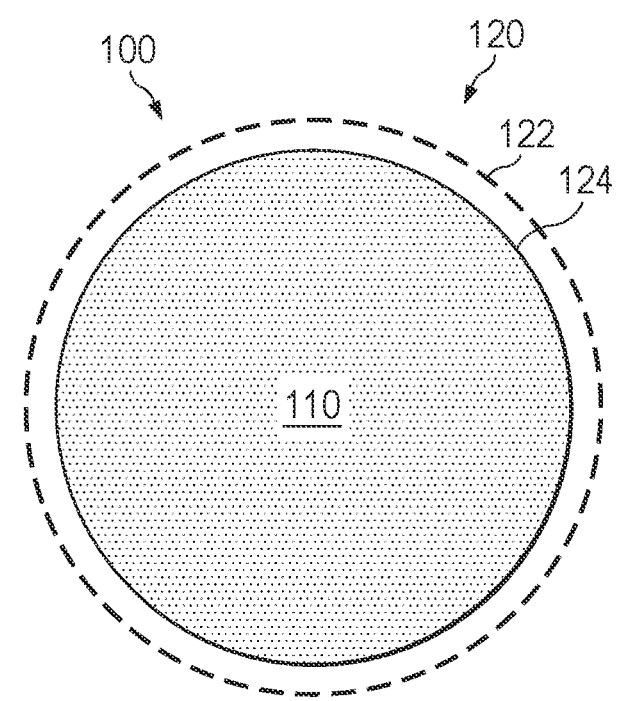
FIG. 2 illustrates a fire-retardant particle with a waterproof outer shell including a rigid structure according to some embodiments.

$_3PO_4$. In some embodiments, the waterproof outer shell 120 may be formed of a coating 122, as shown in FIG. 1. In one or more other embodiments, the outer shell 120 may be formed of a rigid or semi-rigid structure or casing 124. Additionally, or alternatively, the outer shell 120 can include a casing 124 with a coating 122, as shown in FIG. 2. While FIG. 2 illustrates the outer shell 120 with both the casing 124 and the coating 122, it is to be understood that the outer shell 120 can include the casing 124 without the coating 122 as long as the casing 124 inhibits migration of moisture into the shell 120 and contains moisture within the shell 120 as described below.

In any event, the outer shell 120 encases the core 110. In some embodiments, the active chemical component of core 110 is ammonium phosphate. In some embodiments, the active chemical component of core 110 is at least 80% by weight active ammonium phosphate. In some embodiments, the active chemical component of core 110 is at least 90% by weight active ammonium phosphate. In some embodiments, the active chemical component of core 110 is at least 95% by weight active ammonium phosphate. In any event, at least a portion of the remaining composition by weight of the core 110 is a moisture component providing internal moisture to the core 110.

The outer shell 120 is not comprised of ammonium phosphate, but rather a waterproofing material that functions to prevent external moisture from degrading the shell 120 or migrating to the core 110. Moreover, the shell 120 functions to retain the ammonium phosphate and internal moisture within the shell 120. In some embodiments, the outer shell 120 may simply comprise a waterproof coating, such as the coating 122, that encases the core 110 and retains moisture within the shell 120. For example, in some embodiments, shell 120 may be formed of paint or another fluid, that when dried or cured, forms a rigid or hard enclosure that encases core 110.

In one or more embodiments, as described above, one component of the core 110 is a moisture component or liquid, such as an aqueous solution, that can vaporize at a desired temperature. As this moisture component of the core 110 vaporizes when particle 100 is subjected to heat from a fire, the internal pressure within the shell 120 increases to a shell rupture pressure, at which point the shell 120 ruptures, releasing the active chemical of core 110. In one or more embodiments, the rupture pressure may be approximately 15 psig, which is the water vapor pressure at 250° F. In this regard, the energy release from the rupture is also utilized to spread the active chemical core. The shell 120 therefore has enough rigidity to withstand the increasing internal pressure within the shell 120 as a result of the vaporization of the moisture component of the core 110 until the internal pressure reaches the shell rupture pressure, at which point the shell 120 ruptures. The shell 120 also provides enough rigidity to withstand external forces placed on the shell 120 during deployment of the fire-retardant particle 100. For example, if the particle 100 is deployed from a location above the ground (e.g., from an airplane or other aerial vehicle), the shell 120 has enough rigidity to withstand the impact force imparted on the shell 120 and prevent rupture as the particle 100 comes into contact with the ground or other object (e.g., a tree, a rock, a building, etc.). The shell 120 may also have enough rigidity to withstand a crushing force imparted on the shell 120 by a person or animal and therefore not rupture when the person or animal steps on the particle 100. Additionally, the shell 120 may have enough rigidity to withstand a crushing force imparted on the shell 120 by a vehicle (e.g., a car, truck, van, or other motor vehicle) and therefore not rupture when the vehicle drives over the particle 100.

In one or more embodiments, the moisture component is inert, such as water, to ensure that the moisture component is absorbed by the active chemical, but does not react with the active chemical. In addition, the moisture component is no more than 10% by weight of the core 110 so that when the moisture component is absorbed by the active chemical, the combined moisture component and active chemical form a hydrated powder. In some embodiments, the moisture component is no more than 5% by weight of the core 110. In any event, the hydrated powder is dry to the touch, and for handling purposes, is dispersible as a powder. In this regard, the hydrated powder forming the core is "flowable" as a loose particulate solid without caking. It will be appreciated that because the core 110 is in powder form as described, the energy release from bursting of shell 120 under pressure can also utilized to spread the active chemical core.

In some embodiments, the moisture component is water that vaporizes at a temperature above approximately 212° F. Water is desirable since water is inert and can readily be utilized as described to rupture the shell 120 but without interfering with or altering the chemical composition of the core 110. In one or more embodiments, the moisture component is saline. In one or more embodiments, the moisture component is a combination of water, saline, or other inert moisture component. In one or more embodiments, the liquid or aqueous solution that comprises the moisture component of the core 110 may be selected to coincide with a particular desired temperature for rupture but selected so as not to react with the other components of the core 110, such as the active chemical. Thus, in a wildfire fighting product for lower temperature fires, a moisture component with a lower vaporization pressure may be selected to compose the core 110, while in a wildfire fighting product for higher temperature fires, a moisture component with a higher vaporization pressure may be selected to compose the core 110. In one or more embodiments, the moisture component may include a non-volatile solute (such as salt, baking soda or sugar) added to the aqueous solution in order to adjust the vaporization pressure so long as the non-volatile solute does not react with the active chemical. For example, salt may be added to the aqueous solution to raise the vaporization pressure of water. In any event, upon vaporization of the moisture component of the core 110, the increased internal pressure within the shell 120 will cause the shell 120 to rupture.

While the core 110 is described as being hydrated, it will be appreciated that the liquid content of the core 110 is minimal, and the core 110 contains only enough liquid as necessary to increase the internal pressure of the shell 120 upon vaporization to rupture shell 120, but not so much liquid as to cause caking and interfere with spreading of the active chemical upon bursting of the shell 120. In other words, the core 110 is in dry hydrated form, being a hydrated powder containing enough water to pressurize the shell 120 allowing it to burst but sufficiently dry that the active chemical can spread in the form of a powder. Thus, in one or more embodiments, the moisture component is no more than ten percent (10%) by weight of the core 110. In one or more other embodiments, the moisture component is no more than five percent (5%) by weight of the core 110. At these small amounts, the moisture component is absorbed by the active chemical, in the form of a powder, forming the hydrated powder that is dry to the touch, and for handling purposes, is dispersible as a powder.

In one or more embodiments, the fire-retardant particle 100 may comprise a hydrated ammonium phosphate core 110 with a waterproof shell 120. In one or more embodiments, the fire-retardant particle 100 is a prill and comprises a waterproof outer shell 120 with a hydrated core 110 formed primarily of ammonium phosphate. In one or more embodiments, the fire-retardant particle 100 is a prill and comprises a waterproof outer shell 120 that includes a waterproof coating 122 with a hydrated core 110 formed primarily of ammonium phosphate. The coating 122 may form the shell 120 or may encase the shell 120. In one or more embodiments, the fire-retardant particle 100 is a prill and comprises a waterproof outer shell 120 that includes a casing 124 with a hydrated core 110 formed primarily of ammonium phosphate. The casing 124 may form the shell 120 or may encase the shell 120. The casing 124 may be a non-porous, environmentally friendly material. Thus, in some embodiments, the casing 124 may be formed of cellulose acetate. In one or more embodiments, the fire-retardant particle 100 is a prill and comprises a waterproof outer shell 120 that includes the casing 124 and the waterproof coating 122 with a hydrated core 110 formed of ammonium phosphate. The coating 122 may form the shell 120 or may encase the shell 120. In one or more embodiments, the prills, particles, granules or beads that comprise the fire-retardant particle 100 are of a generally uniform size range and comprise one or more inorganic compounds, such as ammonium phosphate, with a waterproof outer shell 120. In this regard, it should be noted that prill formation typically results in particles that are typically of uniform size and spherical shape, which among other characteristics, enhances flowability.

One benefit of the above-described product is that the product may be deployed in an area ahead of a fire, such as in an area where a fire is likely or possible. This may include forested areas that are particularly dry or susceptible to ignition, such as areas with a high presence of dead wood. In any event, the prills 100 may be deployed proactively to an area such as a forest ahead of a fire or preventatively, and being waterproof, can reside for weeks or months without degradation. Upon the occurrence of a fire, the temperature of the fire will cause the prills 100 to rupture, releasing the active fire-retardant chemical core 110. Alternatively, the above-described product may be released on an active fire, in which case, the heat from the fire will cause the prills 100 to rupture, releasing the active fire-retardant chemical core 110. Notably, whether deployed prophylactically or onto an active fire, the prills 100 have sufficient mass that they can be released aerially but be placed with more precision than liquid solutions.

In one or more embodiments, in addition to the active chemical, the core 110 may include an inert material that carries or binds to the water or other liquid molecules forming the core 110 permitting the core 110 to be sufficiently hydrated that upon heating, a phase change to gas causes an increase in the internal pressure within the prill 100, but sufficiently dry so that the active chemical of the core 110 readily spreads when upon bursting of the core 110.

In one or more embodiments, fire-retardant particle 100 is a prill and comprises an environmentally friendly, non-toxic material so that the fire-retardant particles 100 may be deployed in the environment and reside in the environment without harm to the vegetation or wildlife.

In one or more embodiments, the fire-retardant particle 100 is a prill or granule, that may be stored in bulk in large "super sacks" in the form of flexible bags or containers. Often such bags are fabricated of plastic fabric and typically have a horizontal cross-section 4'×4' so that the bags can readily be stored on standard size shipping pallets. In one or more embodiments, the bags may be hung on a horizontal beam inside an aircraft, allowing the bags to be readily moved towards an unloading location in the rear of the aircraft for deployment of the dry product. In one or more embodiments, the bottom of each bag may have a tapered portion leading into an outlet hose, which in some embodiments, may be 3"-4" in diameter. The hose of a bag with dry product being fed to the fire may be attached to a rotary feed valve, which can be adjusted to set a feed rate for release of the dry product.

In one or more embodiments, the feed valve is in communication with a distributor which spreads the discharge perpendicularly in a forward direction of the aircraft so an appropriate width of coverage of the dry product can be achieved at ground level.

Benefits of the firefighting product disclosed herein include the following:

- 10-20 times the amount of active chemical retardant of the disclosure can be carried as a dry product on each aircraft as compared to an active chemical dissolved in an aqueous solution for deployment. In other words, where water is used as a means of deployment of prior art fire retardant from the aircraft, a kilogram of a water solution carried by an aircraft for delivery to a fire is likely to have 10-20 times less active chemical retardant than a kilogram of the firefighting product disclosed herein. This can result in fewer flights and/or decreased costs, especially in areas with greater distance to landing areas and supply sources.
- Uniform granule size of the particles or prills allows more accurate and uniform distribution. In this regard, prior art chemical retardant solutions deployed from aircraft often require viscosity modifiers and other additives to make larger droplet sizes in order to minimize "fines" blowing away from the intended drop area, such as by air turbulence behind the aircraft, or by winds around an active fire.
- No water is needed for deployment of the bulk material from the aircraft. One benefit to deployment of the dry firefighting product disclosed herein is that this alleviates the need to access water to aid in deployment, a problem that is particularly acute in remote areas.
- Chemical purity can be lower in the dry firefighting product disclosed herein because there are no corrosion issues with encapsulated, solid granules (as opposed to aqueous solutions of a fire retardant). In contrast, prior art aqueous solutions currently require higher purity phosphate salt to minimize damage to solution handling equipment (including aircraft surfaces) that can result in the presence of large amounts of water needed for deployment.
- This reduced need for purity can result in lower cost raw material for the dry firefighting product disclosed herein.
- Long term stability of the firefighting product disclosed herein due to waterproof granule coating. In one or more embodiments, the shell 120 is water insoluble and able to withstand exposure up to an external temperature of 220° F., after which the granule will burst as described above. In one or more embodiments, the shell 120 may be paint.

Figure 3:
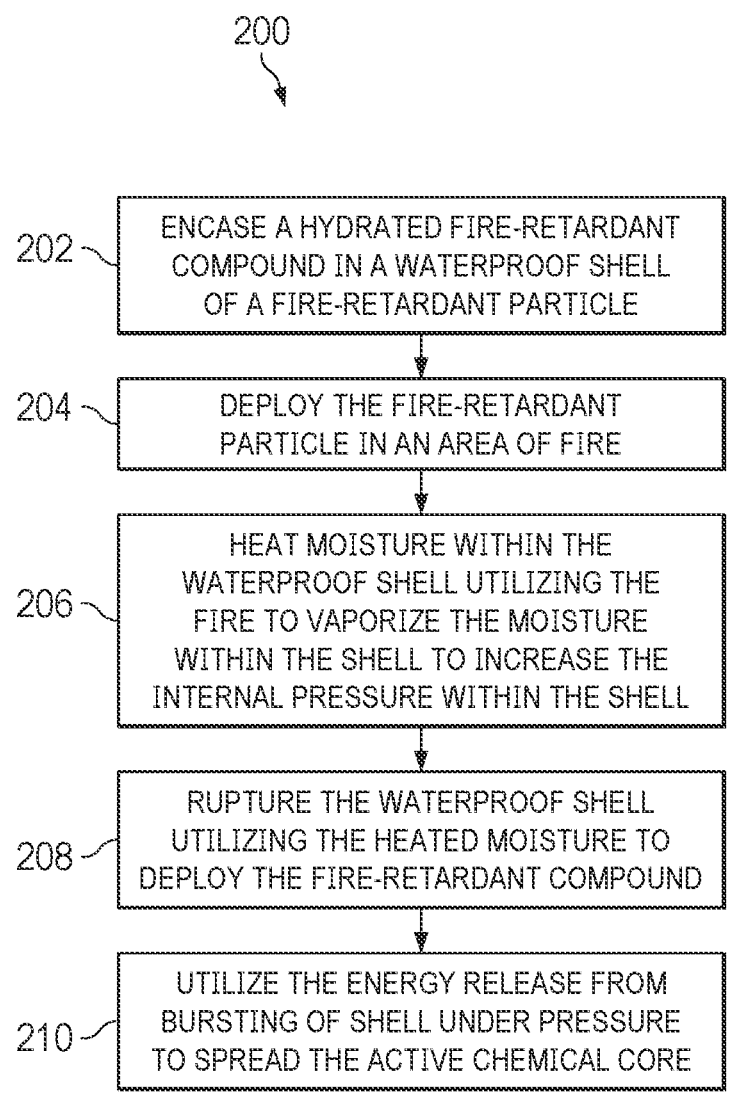
FIG. 3 illustrates a method of fighting a wildfire using fire-retardant particles according to some embodiments.

FIG. 3 is a flow chart illustrating a method 200 for fighting a wildfire. The method 200 utilizes the fire-retardant particle 100 described herein. In a first step 202, a hydrated fire-retardant core 110, which may be a hydrated powder, is encased in a waterproof shell 120 to form a volume of fire-retardant particles 100. In one or more embodiments, the core 110 of each fire-retardant particle 100 is formed of an active chemical component and a moisture component, where the amount of moisture component by weight, when absorbed by the active chemical component, yields a hydrated powder. In one or more embodiments, the moisture component may be an aqueous solution, such as water or brine, and the active chemical component is ammonium phosphate. The waterproof shell 120 may be a coating applied to granules of the core 110, or may be a rigid or semi-rigid casing, with or without a coating. In one or more embodiments, the waterproof shell 120 may be paint, while in other embodiments, the waterproof shell may be formed of a cellulose acetate. In any event, the waterproof shell 120 prevents migration of fluid into the interior of the waterproof shell 120, thereby protecting the core 110, and also contains the moisture component within the waterproof shell 120. In one or more embodiments, the fire-retardant particles 100 are formed by prilling, while in other embodiments, the fire-retardant particles 100 are formed by granulation.

At step 204, a volume of the encased fire-retardant particles (e.g., the particle 100) are deployed in an area of fire. This may be accomplished aerially by releasing the fire-retardant particles from an aircraft. It should be noted that in such a case, the fire-retardant particles are not carried by any type of aqueous solution during deployment, but rather, released as a dry product from the aircraft. The encased fire-retardant particles may also be deployed by ground-based vehicles. Notably, regardless of the type of deployment vehicle or method, the same type of encased fire-retardant particles can be used. In any event, the fire-retardant particles may be deployed in association with an active fire, or may be deployed prophylactically at the beginning of a forest fire season before any active fire is in the area. If deployed with respect to an active fire, the fire-retardant particles may be released into the fire, or may be spread along the ground ahead of an advancing fire. If deployed prophylactically, the prophylactically deployed fire-retardant particles can reside in the environment for extended periods of time since the waterproof shell 120 prevents moisture from degrading or interfering with the core 110.

Once deployed, at step 206, the fire is utilized to heat moisture within the waterproof shell 120. As described above, regardless of the term of deployment, the waterproof shell 120 functions in part to retain the moisture component of the core 110 within the shell 120. Thus, as the fire-retardant particles 100 come into proximity to a fire, the shell 120, as well as the core 110, begins to heat up. At a threshold temperature, the moisture within the core 110 is vaporized within the waterproof shell 120. In one or more embodiments, the moisture component may be selected to vaporize at a select temperature. While some embodiments contemplate use of water as the moisture component, in other embodiments, the moisture component may be selected to be a different liquid so as to adjust the vaporization temperature, so long as the different liquid does not alter the active chemical component. In any event, as the moisture component continues to heat and vaporizes within waterproof shell 120, the internal pressure within the shell increases.

At step 208, the heated moisture is utilized to rupture the waterproof shell 120 so as to deploy the fire retardant. In particular, the internal pressure of the waterproof shell 120 is increased until a point that the internal pressure reaches a shell rupture pressure, at which point the shell 120 ruptures, releasing the active chemical of core 110. In one or more embodiments, the rupture pressure may be approximately 15 psig. Notably, similar to controlling the vaporization of the moisture component by selecting a solution with a desired vaporization pressure, the shell 120 may be selected to have a certain rupture pressure. For example, a shell formed of a coating, such as paint, may have a lower rupture pressure than a shell formed of a more rigid material.

Finally, in addition to utilizing the internal pressure to rupture the shell, at step 210, the energy released from the bursting of the waterproof shell 120 under pressure is utilized to spread the remaining active chemical core. Because the core is comprised of powder, the bursting of the shell will also cause the power to spread. Notably, as the water component of the core 110 is vaporized, this ensures that the remaining active chemical component is particularly dry and spreadable upon rupture of the shell 120.

In one or more embodiments, the firefighting product disclosed herein may be deployed in fire-prone areas or in an area ahead of the path of a fire. In this manner, the firefighting product disclosed herein may be deployed ahead of the fire to ensure the firefighting product disclosed herein is deployed before the fire reaches the deployment location. The firefighting product disclosed herein may be deployed from an airplane, a helicopter, or other aerial vehicle. Additionally, or alternatively, the firefighting product disclosed herein may be deployed from a land-based vehicle. In this regard, being a dry product, it will be appreciated that the firefighting product disclosed herein can be readily deployed from the air or at ground level without the need for different delivery mechanisms or different fire retardants. For example, the prior art may utilize one type of fire retardant for aerial deployment utilizing water to facilitate spraying from aircraft, and another type of fire retardant for ground-based deployment. The fire retardant deployed aerially must be capable of being deployed in a solution without impacting the active chemical. This may result in a different type of fire retardant for ground-based deployment. However, firefighting product disclosed herein can readily be deployed both aerially and via ground vehicles.

The fire retardant may be encased in the shell 120 to form the fire-retardant particle 100, such as a prill. In one or more embodiments, the shell 120 may be formed via a spray crystallization process. The shell 120 may then be shaped or formed around the fire retardant. Alternatively, the fire retardant may be injected into the shell 120.

In one or more embodiments, when the shell 120 ruptures and the fire retardant is deployed, the fire-retardant spreads onto the fire and extinguishes the fire affected by the fire retardant. In some embodiments, the deployed fire retardant may not completely extinguish the fire but may instead reduce the intensity of fire or slow the spread of the fire affected by the fire retardant. In some embodiments, the fire retardant may be used to redirect a path of the fire. For example, the fire retardant may be used to extinguish or slow the spread of a portion of the fire such the path of the fire is redirected away from structures (e.g., houses, commercial buildings, utility facilities, power lines, etc.), populated areas, protected wildlife areas, or any other area to be protected from fire.

While certain embodiments of the present disclosure have been described and shown in the accompanying drawings, it is to be understood that such embodiments are merely illustrative of and not restrictive to the broad disclosed concepts, and that the embodiments of the present disclosure not be limited to the specific constructions and arrangements shown and described, since various other modifications may occur to those ordinarily skilled in the art.

What is claimed is:

1. A fire-retardant particle, comprising:
   a core consisting of a hydrated powder, the hydrated powder consisting of water or saline and ammonium phosphate; and
   a waterproof shell encasing the core, the waterproof shell comprising a paint.

2. The fire-retardant particle of claim 1, wherein the hydrated powder consists of at least 85% by weight of ammonium phosphate and no more than 10% by weight of the water or saline.

3. The fire-retardant particle of claim 1, wherein hydrated powder consists of at least 90% by weight of ammonium phosphate and no more than 5% by weight of the water or saline.

4. The fire-retardant particle of claim 1, wherein the waterproof shell remains rigid until a pressure within the shell reaches a rupture pressure.

5. The fire-retardant particle of claim 4, wherein when the particle is exposed to an external temperature of at least 220° F., a pressure within the shell is at the rupture pressure.

6. A prill, granule, or bead of a controlled size range, the prill, granule, or bead comprising:
   a core consisting of a hydrated powder, the hydrated powder consisting of water or saline and ammonium phosphate; and
   a waterproof shell encasing the core, the waterproof shell comprising a paint.

7. The prill, granule, or bead of claim 6, wherein the hydrated powder consists of at least 85% by weight of ammonium phosphate and no more than 10% by weight of the water or saline.

8. The prill, granule, or bead of claim 6, wherein the hydrated powder consists of at least 90% by weight of ammonium phosphate and no more than 5% by weight of the water or saline.

9. A fire-retardant particle, comprising:
   a core consisting of a hydrated powder, the hydrated powder consisting of at least 95% by weight of ammonium phosphate and water or saline; and
   a waterproof shell encasing the core, the waterproof shell comprising a paint.

10. The fire-retardant particle of claim 9, wherein the fire-retardant particle is one of a prill, a granule, or a bead of a controlled size range.

11. The fire-retardant particle of claim 9, wherein the waterproof shell is rigid and water impermeable.

12. The fire-retardant particle of claim 11, wherein when the particle is exposed to an external temperature of at least 220° F., a pressure within the shell is at the rupture pressure.

13. A method of fighting a fire comprising:
    deploying the fire-retardant particle of claim 1 in an area of fire;
    heating moisture within the waterproof shell utilizing the fire; and
    rupturing the waterproof shell utilizing the heated moisture so as to deploy the ammonium phosphate.

14. The method of claim 13, wherein heating moisture comprises vaporizing the moisture within the waterproof shell to increase the internal pressure within the waterproof shell.

15. The method of claim 13, further comprising encasing the hydrated powder in the waterproof shell, wherein the encasing comprises:
    forming the waterproof shell via a spray crystallization process; and
    shaping the waterproof shell around the hydrated powder.

16. The method of claim 14, further comprising utilizing the energy release from bursting of the waterproof shell under pressure to spread the hydrated powder.

* * * * *